United States Patent
Buescher (10) Patent No.: US 9,594,997 B1
(45) Date of Patent: Mar. 14, 2017

(54) AUXILIARY CHARGE PUMP FOR A RECTIFIER OF AN RFID TRANSPONDER

(71) Applicant: EM Microelectronic-Marin S.A., Marin (CH)

(72) Inventor: Kevin Buescher, Colorado Springs, CO (US)

(73) Assignee: EM Microelectronic-Marin SA, Marin (CH)

( * ) Notice: Subject to any disclaimer, the term of this patent is extended or adjusted under 35 U.S.C. 154(b) by 0 days.

(21) Appl. No.: 14/828,055

(22) Filed: Aug. 17, 2015

(51) Int. Cl.
*G06K 19/06* (2006.01)
*G06K 19/07* (2006.01)
*H02M 7/217* (2006.01)

(52) U.S. Cl.
CPC ..... *G06K 19/0713* (2013.01); *G06K 19/0723* (2013.01); *H02M 7/217* (2013.01)

(58) Field of Classification Search
CPC .. G06K 19/07749; G07F 7/1008; B42D 15/10
USPC .................................. 235/492, 487
See application file for complete search history.

(56) References Cited

U.S. PATENT DOCUMENTS

| 7,944,279 B1 | 5/2011 | El Waffaoui | |
| 2008/0218250 A1* | 9/2008 | Kimura | H02M 3/07 327/536 |
| 2012/0049937 A1 | 3/2012 | El Waffaoui | |

FOREIGN PATENT DOCUMENTS

EP  2 337 200 A1  6/2011

OTHER PUBLICATIONS

European Search Report issued Jan. 5, 2017, in Europe Patent Application No. 16 18 0468.

* cited by examiner

*Primary Examiner* — Karl D Frech
(74) *Attorney, Agent, or Firm* — Oblon, McClelland, Maier & Neustadt, L.L.P.

(57) ABSTRACT

The present invention relates in one aspect to an auxiliary charge pump for a RFID rectifier, the charge pump, which comprises a first charge pump stage (11; 111) connected to an input (14; 114), a second charge pump stage (12; 112) connected to the input, a diode clamp (13; 113) connected to an output (15; 115), and a regulating transistor (16; 116) having a gate connected with an output (21; 121) of the first charge pump stage and having a source and a drain, wherein one of the source and the drain is coupled to the diode clamp. In further aspects the invention relates to a RFID transponder, to a multistage rectifier and to a rectifier stage comprising such an auxiliary charge pump.

14 Claims, 4 Drawing Sheets

AUXILIARY CHARGE PUMP FOR A RECTIFIER OF AN RFID TRANSPONDER

TECHNICAL FIELD

The present invention relates to the field of transponders and in particular to RFID (radio-frequency identification) transponders operable to exchange RF signals with other transponders for various application purposes. Moreover, the invention particularly relates to a rectifier of an RFID transponder more particularly to an auxiliary charge pump of such a rectifier.

BACKGROUND OF THE INVENTION

Radio frequency identification (RFID) systems are widely used for identifying and tracking items, inventory control, supply chain management, anti-theft of merchandize in stores and many other applications. A typical RFID system consists of a plurality of RFID transponders to be interrogated by RFID transceivers or RFID readers. Typically, an RFID reader interrogates one or more of the transponders over a wireless forward link, such as an UHF signal. The transponders respond to the readers' interrogations by transmitting tag information back to the reader over a wireless return link.

There exist active and passive transponders depending on how they are powered. A passive transponder does not have its own power source. Electrical power must be derived from the RF interrogating signal. For this a passive RFID transponder typically includes a loop antenna tuned to receive an RF interrogating signal. The loop antenna is electrically connected to a rectifier of the RFID transponder. The RF interrogating signal induces an AC signal within the loop antenna that is provided to the rectifier. The rectifier rectifies and amplifies the voltage of the AC signal to charge a storage capacitor and/or to power digital circuitry of the transponder.

Figure 1:
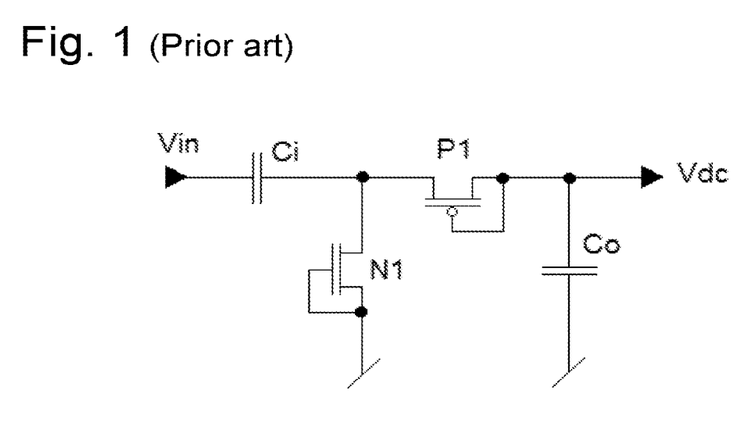
FIG. 1 schematically shows the basic architecture of a prior art rectifier stage of an RFID transponder.

Common architectures of RFID transponders include a Dickson-style charge pump and a multi-stage rectifier comprising a cascade of numerous rectifier stages. A schematic illustration of a rectifier stage implemented with MOS devices is for instance shown in FIG. 1. A rectifier stage according to the prior art comprises an input node Vin, an input capacitor Ci and two metal-oxide-semiconductor field-effect transistors (MOSFETs). Here, the drain of an NMOS transistor N1 is connected to the drain of a PMOS transistor P1. The gate of the NMOS transistor N1 is connected to the source of said transistor. Likewise, also the gate of the PMOS transistor P1 is connected to the source of said PMOS transistor. The source of the PMOS transistor P1 is connected to the output node Vdc of the rectifier stage, which is also connected to ground via an output capacitor Co.

Use of MOSFETs instead of conventional diodes generally improves efficiency of such rectifiers and enables a good integration of the rectifier into CMOS processes.

In order to provide a highly efficient rectifier, a forward resistance of the rectifier stage must be of rather low impedance to reduce resistance and voltage losses while the input signal polarity is correct in order to charge up a main charge pump. When the signal polarity is not correct to charge the output of the rectifier, the rectifier stage should provide a high impedance in the reverse direction to prevent discharging of the charge pump. With the implementation of MOSFETs, this is a balancing act since there is not an abrupt on/off point of the MOSFETs.

With the implementation of a MOSFET-based rectifier stage, a certain voltage level at the input is always required to turn on the MOSFETs. A signal swing at the input must be sufficiently large to turn on NMOS and PMOS transistors. In particular, a peak-to-peak AC swing of the input signal derived from the antenna must exceed the intrinsic threshold voltage of the MOS devices before a rectification can occur. This is a known drawback for low power operated transponders that are hence of high sensitivity.

The U.S. Pat. No. 7,944,279 B1 describes a charge pump stage having voltage biased diodes and utilizing a VT-cancellation technique. The charge pump stage includes rectifier diodes which are voltage biased using an auxiliary charge pump and a voltage clipper diode. Because of a low power operation the voltage clipper has relatively higher impedance. The charge pump stage functions less efficiently at higher input power levels because of the higher impedance of the voltage clipper resulting from a conduction angle of rectifier diodes exceeding Tr. In another embodiment, said document describes a tunable charge pump stage of an RFID tag. The charge pump stage includes an RF node, a capacitor bank, current-biased rectifier stages, a programmable current source, a control circuit, a test pad and a DC bus.

There, the control circuit controls the capacitor bank and programs the programmable current source to provide various biases to the rectifier stages. Such an implementation is rather complicated and expensive.

It is hence commonly known to make use of secondary or auxiliary charge pumps to lower the turn on voltage of MOS devices of a rectifier stage, thus lowering a peak-to-peak AC swing required at the rectifier input to provide rectification.

So for each MOSFET of a rectifier stage, an auxiliary charge pump can be used to generate a rather fixed DC voltage near the turn on voltage of the respective MOSFET. This biases the respective MOSFET at the edge of conductivity so that a large signal on the input is not required to conduct rectification. In general this solution works fine as long as the input voltage level is substantially constant.

For reading and writing a memory of a RFID transponder significantly different input voltage levels have to be provided. As the input voltage increases, for example to conduct a writing procedure, the operating point of the rectifier stage will move. An increasing input voltage may lead to a larger bias of the MOS devices of the rectifier stage thereby increasing the leakage current when the rectifier is supposed to be off. Once there is a significant power provided by the antenna, a decrease in efficiency is tolerable since the signal is large enough. In particular for low input power, it is desirable to increase the efficiency of the rectifier for both, a read input power level and a write input power level.

SUMMARY OF THE INVENTION

It is therefore an aim of the present invention to provide an auxiliary or secondary charge pump for a rectifier stage and in particular for a multi-stage rectifier configured for a RFID transponder. The auxiliary charge pump should provide and support improved rectification efficiency of the respective rectifier. In addition, the modified auxiliary charge pump should be easily implementable and should only require minimal modifications of existing auxiliary charge pump and rectifier architectures.

In one aspect the invention relates to an auxiliary charge pump for a rectifier and in particular to an auxiliary charge pump configured and operable for a rectifier of an RFID transponder. The auxiliary charge pump comprises an input and an output. The input is typically connected to an antenna of the RFID transponder whereas the output serves to bias a MOS device of a rectifier stage. Typically, the output of the auxiliary charge pump is connected to the gate of a MOSFET of a rectifier stage. The auxiliary charge pump comprises a first charge pump stage connected to the input and further comprises a second charge pump stage which is also connected to the input. There is further provided a diode clamp that is connected to the output. The auxiliary charge pump also comprises a regulating transistor having a gate connected with an output of the first charge pump stage and having a source and a drain. One of the source and the drain of the regulating transistor is coupled or connected to the diode clamp.

The diode clamp provides a well-defined DC output voltage to bias a MOS device, typically a MOSFET of a rectifier stage. The first and the second charge pump stages are arranged in a kind of a cascade. At the output of the first charge pump stage, there will be provided a significantly lower voltage than at the output of the auxiliary charge pump. By connecting the regulating transistor to the output of the first charge pump stage, it will not immediately turn on as long as the input voltage Vin is comparatively low. At low input voltage levels, the regulating transistor will not have a substantial effect on the auxiliary charge pump. But as the input voltage increases, the regulating transistor will start to operate in triode mode. It will act as a kind of a resistor and will decrease in resistance with a rising input voltage. This reduction in resistance will then provide a lower impedance path for the current flowing in the diode clamp. At the end, this will prevent a substantial increase of the output voltage in response to a rise of the input voltage.

In other words, by making use of a regulating transistor between first and second charge pump stages and the diode clamp a modification of the output voltage level in response to a varying input voltage level can be effectively decreased. In this way, the bias provided by the auxiliary charge pump at the MOSFETs of a rectifier stage is kept at a rather constant level even with comparatively large variations of the input voltage, as it e.g. required for a writing and a reading procedure.

According to another embodiment, the regulating transistor is an NMOS transistor. Here, the drain of the regulating transistor is coupled to the diode clamp. The source of the regulating transistor is then typically connected to ground. Implementation of the regulating transistor as an NMOS transistor is of particular use to provide an auxiliary charge pump for an NMOS transistor of a rectifier stage.

In another embodiment the regulating transistor is a PMOS transistor. Here, the source of the regulating transistor is coupled to the diode clamp.

The drain of the regulating transistor is then connected to ground. Implementation of the regulating transistor as a PMOS transistor is of particular use to provide an auxiliary charge pump to bias a PMOS transistor of a rectifier stage.

According to another embodiment, the diode clamp comprises multiple diode clamp transistors connected in series. This means that a drain of a first clamp transistor is connected to a source of a second clamp transistor. A drain of the second clamp transistor is connected to a source of a third clamp transistor and so on. For coupling or connecting the regulating transistor to the diode clamp, either the source or the drain of the regulating transistor is connected to a node located between the drain and source of two adjacently located diode clamp transistors.

With an NMOS regulating transistor, it is the drain of said transistor that is connected to the diode clamp whereas the source of the regulating transistor is connected to ground.

The stack of diode clamp transistors is connected with one end to the output of the auxiliary charge pump and is connected with an opposite end to ground. With this arrangement of the regulating transistor and the diode clamp at least some of the stacked diode clamp transistors are bridged or bypassed thereby reducing the output voltage of the auxiliary charge pump or keeping the output voltage level as the input voltage increases.

According to another embodiment, the gates of the diode clamp transistors are connected in parallel. The gates of the diode clamp transistors are hence also connected to the output of the auxiliary charge pump. In this way a stack of clamp transistors is provided between the output of the auxiliary charge pump and ground.

In addition and according to another embodiment, the gates of the diode clamp transistors are connected to an output node of the second charge pump stage. Moreover, the output node of the second charge pump stage is also connected to the output of the auxiliary charge pump. In other words, the output node of the second charge pump stage constitutes the output of the auxiliary charge pump.

According to another embodiment, the first and the second charge pump stages each comprise at least a first transistor and a second transistor. First and second transistors are typically native metal-oxide-semiconductor field-effect transistors (MOSFETs). The first and second transistors of first and second charge pump stages nearly have a zero threshold voltage. Use of native transistors in the first and second charge pump stages is beneficial to improve the low-voltage operation of the auxiliary charge pump, and hence a low voltage operation of the rectifier and the entire RFID transponder.

The various first and second transistors of first and second charge pump stages could be equally sized. In other embodiments, the first and second transistors of first and second charge pump stages are differently sized. This allows to control the turn on characteristics of the regulating transistor. It allows further to tune the output voltage of at least the first charge pump stage to provide an optimal performance of the auxiliary charge pump and the rectifier stage.

According to another embodiment, a gate and a source of the second transistor of at least one of the first and second charge pump stages is connected to an input node of the first or second charge pump stages. Typically, a gate and a source of the second transistor of the first charge pump stage is connected to the input node of this first charge pump stage. A gate and a source of the second transistor of the second charge pump stage is typically connected to an input node of the second charge pump stage.

Additionally, a drain of the first transistor of at least one of the first and the second charge pump stages is connected to the input node of the respective first or second charge pump stages. In particular, a drain of the first transistor of the first charge pump stage is connected to the input node of the first charge pump stage. A drain of the first transistor of the second charge pump stage is connected to the input node of the second charge pump stage.

Typically, first and second native MOSFETs of first and second charge pump stages are implemented as NMOS native transistors.

According to another embodiment, a drain of the second transistor of at least one of first and second charge pump stages is connected to an output node of the first or second charge pump stage. Typically, a drain of the second transistor of the first charge pump stage is connected to an output node of the first charge pump stage. Also, a drain of the second transistor of a second charge pump stage is connected to an output node of this particular second charge pump stage.

Furthermore and according to another embodiment, the output node of the first charge pump stage is connected to a gate and to a source of the first transistor of the second stage. In other words the drain of the second transistor of the first charge pump stage is connected at least to a gate or to a drain of the first transistor of the second stage.

According to another aspect, the invention provides a rectifier stage comprising a PMOS transistor and an NMOS transistor. Here, a drain of the NMOS transistor and a source of the PMOS transistor are connected to an input node of the rectifier stage. A first charge pump as described above is connected to a gate of the NMOS transistor and a second charge pump as described above is connected to a gate of the PMOS transistor. Typically, the auxiliary charge pump with a PMOS-type regulating transistor is connected to the gate of the PMOS transistor of the rectifier stage and an auxiliary charge pump with an NMOS-based regulating transistor is connected to the gate of the NMOS transistor of the rectifier stage.

In this way the gates of both, the NMOS transistor and the PMOS transistor are each individually provided with a separate auxiliary charge pump that is individually configured for an NMOS or PMOS transistor of the rectifier.

According to another aspect, the invention also relates to a multi-stage rectifier comprising at least two rectifier stages as described above. The multi-stage rectifier typically comprises a cascade of multiple rectifier stages. Here, all input nodes of the rectifier stages are connected in parallel and are hence connected to an input of the multi-stage rectifier. An output of a first rectifier stage is further connected to the source of the NMOS transistor of an adjacently located rectifier stage and so on. Only the output of the last rectifier stage then serves as an output to drive, e.g. the processor or other electronic components of the RFID transponder.

In still another aspect the invention also relates to a transponder, typically to a RFID transponder and in particular to a passive RFID transponder. The transponder comprises at least an antenna, a controller and a multi-stage rectifier as described above, typically including numerous auxiliary charge pumps as described above.

BRIEF DESCRIPTION OF THE DRAWINGS

In the following, two different embodiments of an auxiliary charge pump and their implementation into a rectifier stage and into a multi-stage rectifier of an RFID transponder are described in more detail by making reference to the drawings, in which.

DETAILED DESCRIPTION OF EMBODIMENTS OF THE INVENTION

Figure 4:
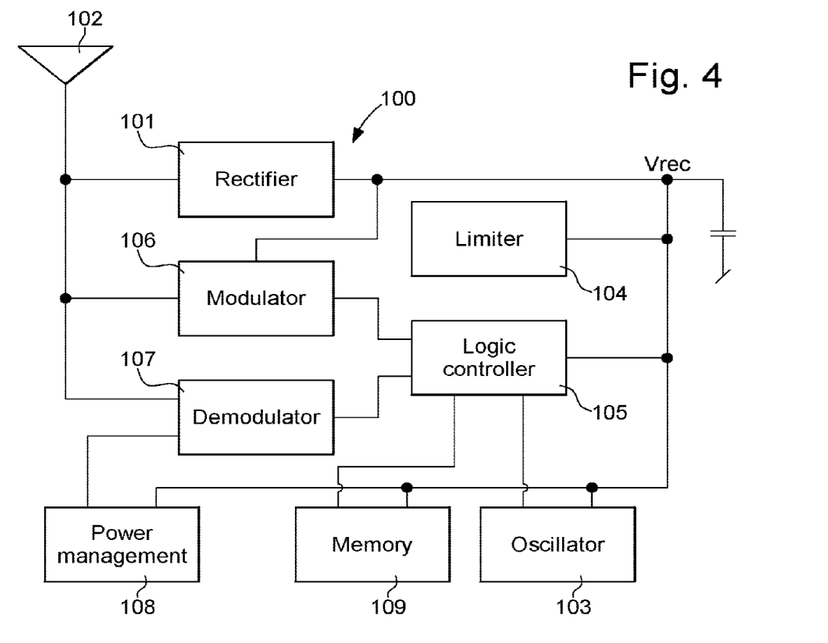
FIG. 4 schematically shows an RFID transponder comprising a multi-stage rectifier as shown in FIG. 3.

In FIG. 4, an RFID transponder 100 is shown. The transponder 100 comprises an antenna 102 that is connected to a modulator 106 and to a demodulator 107. The antenna 102 is further connected to a rectifier 101 that serves to transfer an RF signal received by the antenna 102 into a DC signal. When implemented as a passive RFID transponder, the antenna 102 and the rectifier 101 provide a power source for the various electronic components of the transponder 100. At the output of the rectifier 101 a driving voltage Vrec is provided. The output of the rectifier 101 is further connected with a limiter 104. The demodulator 107 as well as the modulator 106 are connected with a logic controller 105, which is driven by the voltage provided at the output of the rectifier 101.

The RFID transponder 100 further comprises a power management 108, a memory 109 as well as an oscillator 103. The power management 108, the memory 109 and the oscillator 103 are all connected to the logic controller 105. Power management 108, memory 109 and the oscillator 103 are further driven by the voltage Vrec obtainable at the output of the rectifier 101.

Figure 3:
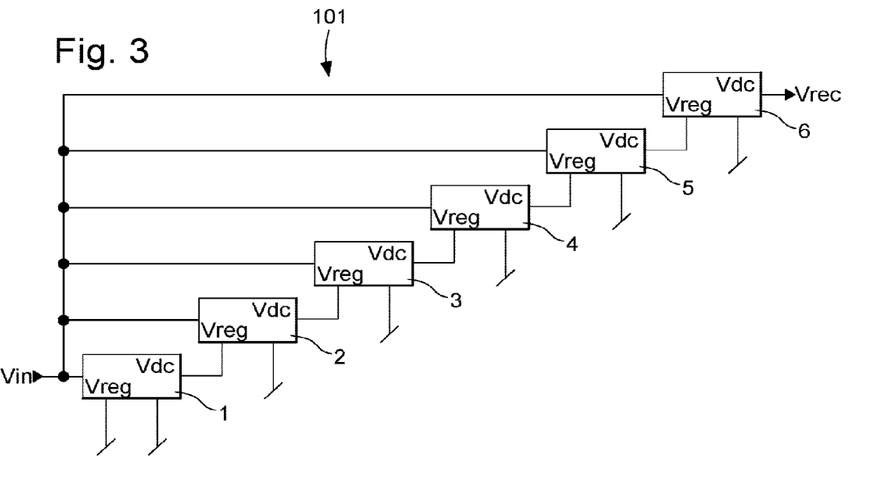
FIG. 3 schematically shows a multi-stage rectifier comprising numerous rectifier stages as described in FIG. 2.

The rectifier 101 is shown in more detail in FIG. 3. The rectifier 101 is a multi-stage rectifier. It comprises numerous rectifier stages 1, 2, 3, 4, 5, 6. Each rectifier stage 1, 2, 3, 4, 5, 6 comprises an input each of which being individually connected to an AC input Vin obtainable from the antenna 102. An output Vdc of the first rectifier stage 1 is further connected with a Vreg input of the second rectifier stage 2. An output Vdc of the second rectifier stage 2 is connected to an input Vreg of the third rectifier stage 3 and so on. The main output of the cascade of rectifier stages 1, 2, 3, 4, 5, 6 Vrec is connected to the limiter 104 and to the logic controller 105 as illustrated in FIG. 4.

Figure 2:
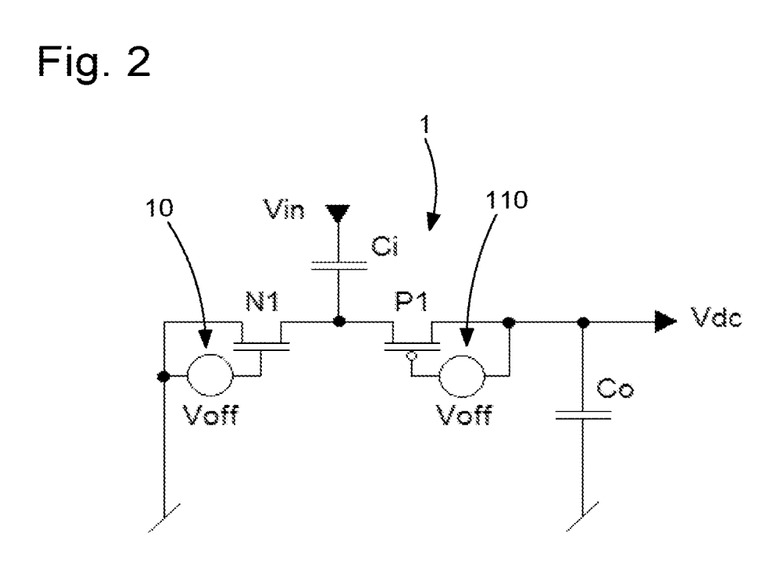
FIG. 2 shows a rectifier stage with two individual auxiliary charge pumps according to the present invention.

The internal architecture of each of the rectifier stages 1, 2, 3, 4, 5, 6 is schematically shown in FIG. 2. The rectifier stage 1 as shown in detail in FIG. 2 comprises an NMOS transistor N1 and a PMOS transistor P1 that are arranged in a conventional way so as to provide a rectifier stage. Hence, an input node 50 connected to Vin via an input capacitor Ci is connected to the drain of the NMOS transistor N1 and also to the source of the PMOS transistor P1. The drain of the PMOS transistor is connected to the output Vdc of the rectifier stage 1. The output Vdc is connected to ground via an output capacitor Co. The source of the NMOS transistor N1 is connected to ground. The rectifier stage 1 as shown in FIG. 2 further comprises two auxiliary or secondary charge pumps 10, 110. Here, an input of the auxiliary charge pump 10 is connected to ground and an output thereof is connected to the gate of the NMOS transistor. Likewise, the input of the auxiliary charge pump 110 is connected to the output Vdc and hence to the drain of the PMOS transistor P1. The output of the auxiliary charge pump 110 is connected to the gate of the PMOS transistor P1. A more detailed view of the two auxiliary charge pumps 10, 110 is given in FIGS. 5 and 6, respectively.

Figure 5:
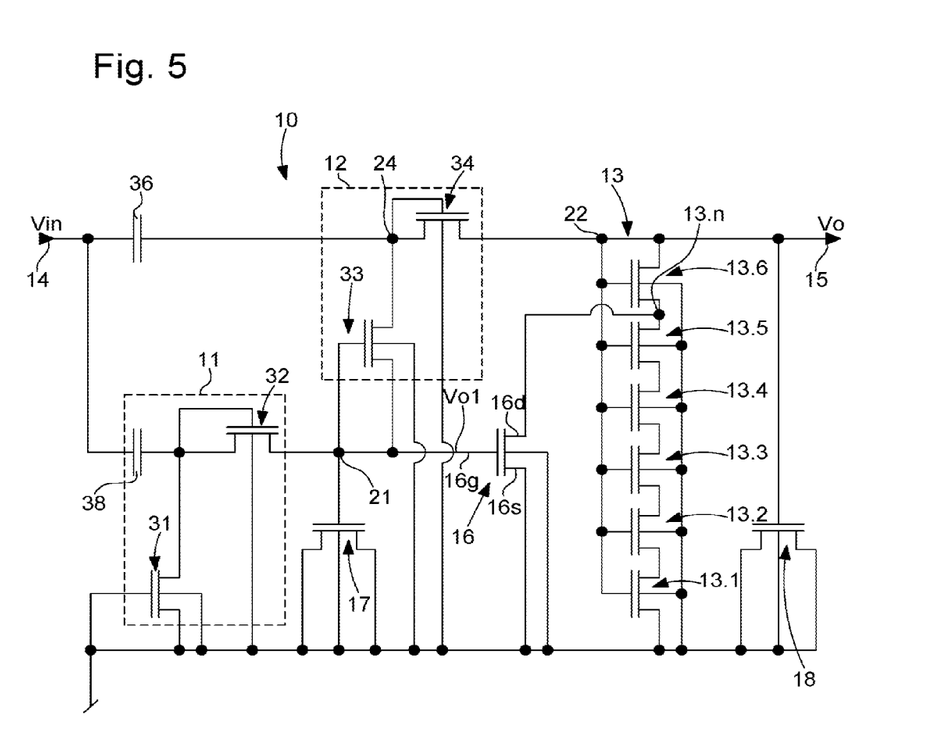
FIG. 5 shows one embodiment of an auxiliary charge pump for a rectifier stage with an NMOS transistor as a regulating transistor.

The auxiliary charge pump 10 as shown in FIG. 5 comprises a first charge pump stage 11 and a second charge pump stage 12 as well as a diode clamp 13. The inputs, hence the input nodes 23, 24 of the first and second charge pump stages 11, 12 are both connected to an input 14 Vin. An output node 22 of the second charge pump stage 12 is connected to a charge pump output 15. The auxiliary charge pump output 15 is connected to ground via a transistor 18 having a gate connected to the output 15 and having a drain, a source and a bulk connected to ground. The diode clamp 13 comprises numerous diode clamp transistors 13.1, 13.2, 13.3, 13.4, 13.5, 13.6. The stack of clamp transistors is formed by connecting all clamp transistors 13.1, 13.2, 13.3, 13.4, 13.5, 13.6 in a row. Hence, the source of a first clamp transistor 13.1 is connected to ground. A drain of said transistor 13.1 is connected to the source of a second diode clamp transistor 13.2 and so on. The gates of all these clamp transistors 13.1, 13.2, 13.3, 13.4, 13.5, 13.6 are connected in parallel and are further connected to the output node 22 of the second charge pump stage 12 or to the output 15 of the auxiliary charge pump 10. In the embodiment as shown in FIG. 5, there is further provided a particular node 13n that is located between a source of a diode clamp transistor 13.6 and a drain of an adjacently located diode clamp transistor 13.5.

Input nodes 23, 24 of the first and second charge pump stages 11, 12 are connected to the input 14 via respective input capacitors 36, 38. The input node 24 of the second charge pump stage 12 is connected to the input 14 via the capacitor 36 and the input node 23 of the first charge pump stage 11 is connected to the input 14 via the input capacitor 38. The two input capacitors 36, 38 as well as the two input nodes 24, 23 are connected in series.

There is further provided a regulating transistor 16. The regulating transistor 16 is implemented as an NMOS transistor. A drain 16d of the regulating transistor 16 is connected to the node 13n of the diode clamp 13. A source 16s of the regulating transistor 16 is connected to ground. A gate 16g of the regulating transistor 16 is connected to an output node 21 of the first charge pump stage 11. A voltage Vo1 obtainable at the output node 21 is typically lower than a voltage Vo at the output 15 of the auxiliary charge pump 10.

Since the gate 16g of the regulating transistor 16 is connected to the output 21 of the first charge pump stage 11, it will be at a significantly lower voltage Vo1 compared to the voltage Vo obtainable at the output 15 of the auxiliary charge pump 10. During operation, this means that the regulating transistor 16 will not immediately turn on as there is a voltage present at the input 14 of the auxiliary charge pump 10. Only as Vin increases at the input 14, this transistor 16 will begin to operate in triode mode. It will typically behave as a resistor and will decrease in resistance as Vin increases.

The dynamic reduction in resistance of the regulating transistor 16 will then provide a lower impedance path for the current flowing in the diode clamp 13. This serves to keep the output voltage Vo at the output 15 from increasing.

In this way, for various levels of an input voltage Vin at the input 14 of the auxiliary charge pump 10, a rather constant output voltage Vo can be provided at the output 15. At least variations of the output voltage Vo to bias the NMOS transistor N1 of a rectifier 1 can be kept rather constant or the output voltage Vo is subject only to small modifications as the input voltage Vin changes, e.g. when the RFID transponder 100 switches between a read and a write mode.

As it is further shown in FIG. 5, each of the first and second charge pump stages 11, 12 comprises two transistors 31, 32, 33, 34. The first charge pump stage 11 comprises a first transistor 31 and a second transistor 32. The second charge pump stage 12 comprises a first transistor 33 and a second transistor 34. The gate and the source of the second transistors 32, 34 of both charge pump stages 11, 12 are connected to the respective input node 23, 24 of the first and the second charge pump stage 11, 12, respectively. The drain of the second transistor 32 of the first charge pump stage 11 is connected to the output 21 of the first charge pump stage 11. It is hence connected to the gate 16g of the regulating transistor 16.

The drain of the second transistor 34 of the second charge pump stage 12 is connected to the output node 22 and hence to the output 15 of the auxiliary charge pump 10. A drain of the first transistor 31, 33 of first and second charge pump stages 11, 12 is connected to the input node 23, 24, respectively. The gate and the source of the first transistor 31 of the first charge pump stage 11 are connected to ground. The gate and the source of the first transistor 33 of the second charge pump stage 12 are connected to the output node 21 of the first charge pump stage 11. In this way, the first and second transistors 31, 32, 33, 34 of first and second charge pump stages 11, 12 are arranged in a cascade-like way.

Additionally, it is to be mentioned that the output node 21 of the first charge pump stage 11 is connected to ground via an additional transistor 17. Here, the gate of this transistor 17 is connected to the output node 21. The source and the drain as well as the bulk of this transistor 17 is connected to ground. The transistor 17 as well as the transistor 18 effectively act as a kind of a capacitor.

Without further mentioning, it is apparent that the bulk of each of the transistors as shown in FIG. 5 is connected to ground.

The regulating transistor 16 as shown in FIG. 5 is implemented as an NMOS transistor. Therefore, the auxiliary charge pump 10 as shown in FIG. 5 is particularly operable to provide a bias for the gate of the NMOS transistor N1 of the rectifier stage 1 as shown in FIG. 2.

Figure 6:
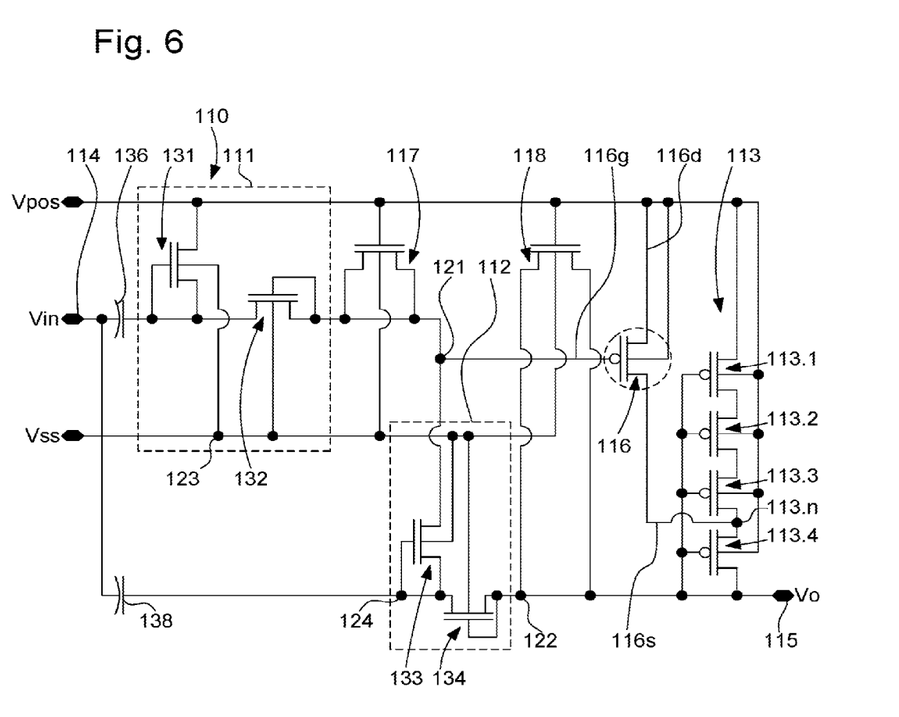
FIG. 6 shows another implementation of the auxiliary charge pump with a PMOS transistor as a regulating transistor.

In FIG. 6 a further implementation of an auxiliary charge pump 110 is illustrated. Here, like or identical components in comparison to those as already described in connection with FIG. 5 are provided with identical reference numbers increased by 100. So the auxiliary charge pump 110 also comprises a first and a second charge pump stage 111, 112, each of which comprising a first and a second transistor 131, 132, 133, 134. Input nodes 123, 124 of first and second charge pump stages 111, 112 are connected to an input 114 of the auxiliary charge pump 110 via respective capacitors 136, 138. There are provided two additional transistors 117, 118, effectively acting as capacitors. A regulating transistor 116 is coupled or connected to a diode clamp 113. Here and in contrast to the embodiment as shown in FIG. 5, the regulating transistor 116 is implemented as a PMOS transistor. Additionally also the diode clamp transistors 113.1, 113.2, 113.3 and 113.4 are implemented as PMOS transistors while the diode clamp transistors 13.1, 13.2, 13.3, 13.4, 13.5, 13.6 as shown in FIG. 5 are implemented as NMOS transistors.

An output node 122 of the second charge pump stage 112 is connected to the output 115 of the auxiliary charge pump 110. The gate 116g of the regulating transistors 116 is connected to an output node 121 of the first charge pump stage 111. A drain 116d of the regulating transistor 116 is connected to ground Vpos whereas a source 116s is connected to a node 113.n located between two adjacently located diode clamp transistors 113.3 and 113.4.

The bulk of all transistors 117, 118, 131, 132, 133, 134 is connected to Vss. Only the bulk of the regulating transistor 116 is connected to ground Vpos.

The functionality of the auxiliary charge pump 110 is symmetric or identical to the functionality of the auxiliary charge pump 10 as described in connection with FIG. 5. Due to the PMOS-based implementation the auxiliary charge pump 110 is operable to bias the gate of the PMOS transistor P1 of the rectifier stage 1.

The invention claimed is:

1. An auxiliary charge pump for a rectifier, the auxiliary charge pump comprising:
 a first charge pump stage connected to an input,
 a second charge pump stage connect to the input,
 a diode clamp connected to an output, and
 a regulating transistor having a gate connected with an output of the first charge pump stage and having a source and a drain, wherein one of the source and the drain is coupled to the diode clamp,
 wherein the diode clamp comprises multiple diode clamp transistors connected in series, and
 wherein the source or the drain of the regulating transistor is connected to a node located between the drain and source of two diode clamp transistors.

2. The auxiliary charge pump according to claim 1, wherein the regulating transistor is an NMOS transistor, and wherein the drain of the regulating transistor is coupled to the diode clamp.

3. The auxiliary charge pump according to claim 2, wherein the source of the regulating transistor is connected to ground.

4. The auxiliary charge pump according to claim 1, wherein the regulating transistor is a PMOS transistor, and wherein the source of the regulating transistor is coupled to the diode clamp.

5. The auxiliary charge pump according to claim 4, wherein the drain of the regulating transistor is connected to ground.

6. The auxiliary charge pump according to claim 1, wherein the gates of the diode clamp transistors are connected in parallel.

7. The auxiliary charge pump according to claim 6, wherein the gates of the diode clamp transistors are connected to an output node of the second charge pump stage.

8. The auxiliary charge pump according to claim 1, wherein the first and the second charge pump stages each comprise at least a first transistor and a second transistor, wherein the first and second transistors are native metal-oxide-semiconductor field-effect transistors.

9. The auxiliary charge pump according to claim 8, wherein a gate and a source of the second transistor is connected to an input node of the first or second charge pump stage, and wherein a drain of the first transistor is connected to the input node.

10. The auxiliary charge pump according to claim 9, wherein a drain of the second transistor is connected to an output node of the first or second charge pump stage.

11. The auxiliary charge pump according to claim 10, wherein the output node of the first charge pump stage is connected at least to a gate or to a drain of the first transistor of the second stage.

12. A rectifier stage comprising:
 a PMOS transistor,
 an NMOS transistor, wherein a drain of the NMOS transistor and a source of the PMOS transistor are connected to an input node,
 a first auxiliary charge pump connected to a gate of the NMOS transistor, and
 a second auxiliary charge pump connected to a gate of the PMOS transistor,
 wherein the first auxiliary charge pump is an auxiliary charge pump for a rectifier, the auxiliary charge pump comprising:
 a first charge pump stage connected to an input,
 a second charge pump stage connect to the input,
 a diode clamp connected to an output, and
 a regulating transistor having a gate connected with an output of the first charge pump stage and having a source and a drain, wherein one of the source and the drain is coupled to the diode clamp.

13. A multistage rectifier comprising at least two rectifier stages according to claim 12.

14. A transponder, comprising an antenna, a controller and a multistage rectifier according to claim 13.

* * * * *

UNITED STATES PATENT AND TRADEMARK OFFICE
CERTIFICATE OF CORRECTION

PATENT NO. : 9,594,997 B1
APPLICATION NO. : 14/828055
DATED : March 14, 2017
INVENTOR(S) : Kevin Buescher Page 1 of 1

It is certified that error appears in the above-identified patent and that said Letters Patent is hereby corrected as shown below:

In the Claims

In Column 9 Claim 1, Line 5, delete "connect" and insert --connected--;

In Column 10 Claim 12, Line 28, delete "connect" and insert --connected--.

Signed and Sealed this
Twenty-fourth Day of April, 2018

Andrei Iancu
*Director of the United States Patent and Trademark Office*